United States Patent
Shin et al.

(10) Patent No.: US 10,021,291 B2
(45) Date of Patent: Jul. 10, 2018

(54) PORTABLE DEVICE ENABLING A USER TO MANUALLY ADJUST LOCATIONS OF FOCUSING AND PHOTOMETRY AND METHOD FOR TAKING IMAGES

(71) Applicant: Samsung Electronics Co., Ltd., Gyeonggi-do (KR)

(72) Inventors: Jong Pil Shin, Seoul (KR); Do Hwan Choi, Gyeonggi-do (KR); Jong Hyun An, Seoul (KR); Chang Woo Park, Seoul (KR); Ha Ran Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/971,547

(22) Filed: Dec. 16, 2015

(65) Prior Publication Data
US 2016/0105605 A1    Apr. 14, 2016

Related U.S. Application Data

(63) Continuation of application No. 11/925,531, filed on Oct. 26, 2007, now Pat. No. 9,253,404.

(30) Foreign Application Priority Data

Nov. 16, 2006  (KR) .................... 10-2006-0113111

(51) Int. Cl.
| | |
|---|---|
| *H04N 5/222* | (2006.01) |
| *H04N 5/232* | (2006.01) |
| *G06F 3/0488* | (2013.01) |
| *H04N 5/235* | (2006.01) |

(52) U.S. Cl.
CPC ....... *H04N 5/23216* (2013.01); *G06F 3/0488* (2013.01); *H04N 5/235* (2013.01); *H04N 5/2353* (2013.01); *H04N 5/23212* (2013.01); *H04N 5/23219* (2013.01); *H04N 5/23293* (2013.01)

(58) Field of Classification Search
CPC ............... H04N 5/235; H04N 5/23212; H04N 5/23216; H04N 5/23219; H04N 5/23293; G06F 3/0488
USPC ....................... 348/333.01–333.02, 345, 351
See application file for complete search history.

(56) References Cited

U.S. PATENT DOCUMENTS

| | | | |
|---|---|---|---|
| 4,780,766 A | 10/1988 | Nutting | |
| 5,749,000 A | 5/1998 | Narisawa | |
| 6,940,545 B1 | 9/2005 | Ray et al. | |
| 7,034,881 B1 * | 4/2006 | Hyodo | H04N 5/2351 348/231.6 |
| 7,480,003 B2 | 1/2009 | Okawara | |
| 7,551,223 B2 | 6/2009 | Tanaka | |

(Continued)

FOREIGN PATENT DOCUMENTS

JP       4284998       4/2009

*Primary Examiner* — Ngoc-Yen Vu
(74) *Attorney, Agent, or Firm* — The Farrell Law Firm, P.C.

(57) ABSTRACT

A portable device adapted to enable its user to manually adjust the focus and photometry locations during photography and a method for taking images with the device is disclosed. A GUI for indicating the focus or photometry location is provided on the screen so that the user can manually move the GUI on the screen with a keypad or a touch panel. In this manner, a desired object is taken at the focus or photometry location.

8 Claims, 5 Drawing Sheets

(56) References Cited

U.S. PATENT DOCUMENTS

| | | | |
|---|---|---|---|
| 7,573,505 B2 | 8/2009 | Kawaguchi et al. | |
| 7,844,076 B2* | 11/2010 | Corcoran | G06K 9/00228 |
| | | | 348/152 |
| 7,932,949 B2* | 4/2011 | Hyodo | G03B 3/12 |
| | | | 348/345 |
| 8,194,173 B2* | 6/2012 | Kawahara | H04N 5/23212 |
| | | | 348/345 |
| 8,525,892 B2* | 9/2013 | Shimosato | H04N 5/23212 |
| | | | 348/220.1 |
| 2006/0007322 A1 | 1/2006 | Nakamura et al. | |
| 2006/0012690 A1 | 1/2006 | Nakamura et al. | |
| 2006/0012702 A1 | 1/2006 | Kawahara et al. | |
| 2006/0061677 A1 | 3/2006 | Yoshida | |
| 2006/0238622 A1 | 10/2006 | Shimosato | |
| 2007/0019940 A1 | 1/2007 | Sasaki | |
| 2007/0291338 A1* | 12/2007 | Williams | H04N 1/00161 |
| | | | 358/537 |
| 2012/0278745 A1* | 11/2012 | Kim | G06F 3/04817 |
| | | | 715/769 |

* cited by examiner

PORTABLE DEVICE ENABLING A USER TO MANUALLY ADJUST LOCATIONS OF FOCUSING AND PHOTOMETRY AND METHOD FOR TAKING IMAGES

PRIORITY

This application is a continuation application of U.S. patent application Ser. No. 11/925,531, which was filed on Oct. 26, 2007 and claims priority under 35 U.S.C. § 119(a) to an application filed in the Korean Intellectual Property Office on Nov. 16, 2006 and assigned Serial No. 2006-0113111, the contents of which are incorporated herein by reference.

BACKGROUND OF THE INVENTION

1. Field of the Invention

The present invention relates generally to a portable device having a display and a camera module (e.g. camera phone), and more particularly to a portable terminal adapted to enable its user to manually adjust the location of focusing and photometry during photography and a method for taking images with the portable terminal.

2. Description of the Prior Art

As generally known in the art, portable devices (e.g. portable telephones, MP3 players, digital cameras) tend to have a display and a camera module, the function of which has been developed to increase user convenience. Particularly, the automatic focusing and photometry functions enable users to take images simply by pressing the corresponding key button.

When a conventional portable device is used to take images, it commonly locates the focus at the center of the screen and measures the luminosity of the region where the focus is located. This means that, in some cases, the device may focus on an unwanted object and measure the wrong luminosity. For example, although the user wants to focus the device on an object located at the upper right corner of the screen, the focus may lie at the center of the screen. Furthermore, even if the device is focused on the upper right corner of the screen, the focus may still not be on the desired object, because focusing is limited to predetermined locations. As a result, the device fails to focus on the desired object and measure the correct luminosity. This means that photography is not conducted as desired by the user.

SUMMARY OF THE INVENTION

Accordingly, the present invention has been made to solve the above-mentioned problems occurring in the prior art, and the present invention provides a portable device adapted to focus on a desired object on the screen and measure luminosity of the desired object so that correct exposure is determined, as well as a method for taking images with the portable device.

The present invention also provides a portable device adapted to focus on a number of desired objects on the screen and measure their luminosity, as well as a method for taking images with the portable device.

In accordance with one aspect of the present invention, there is provided a portable device including a photography unit for receiving light reflected from an object and converting the light into an electric signal so as to take an image of the object; an image processing unit for processing the electric signal output by the photography unit and outputting image data; an input unit for receiving an input from a user; a control unit for selecting a location of an object from the image data output by the image processing unit and moving a focus to the selected location based on an input signal from the input unit; a display unit for displaying the image data after the focus has been moved by the control unit; and a storage unit for storing the image data output by the image processing unit under control of the control unit.

In accordance with another aspect of the present invention, there is provided a method for taking an image with a portable device, the method including initiating photography so as to receive an input of an image signal; designating at least one focus location; and conducting focus processing with regard to at least one region where the focus location is designated in.

In accordance with another aspect of the present invention, there is provided a method for taking an image with a portable device, the method including initiating photography so as to receive an input of an image signal; designating at least one photometry location; measuring luminosity of an object in at least one region where the photometry location is designated in; and correcting exposure based on the measured luminosity.

In accordance with another aspect of the present invention, there is provided a method for taking an image with a portable device, the method including initiating photography so as to receive an input of an image signal; designating at least one focus location and at least one photometry location; conducting focus processing with regard to at least one focus region where the focus location is designated in; and measuring luminosity of an object in at least one photometry region where the photometry location is designated in so as to correct exposure.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
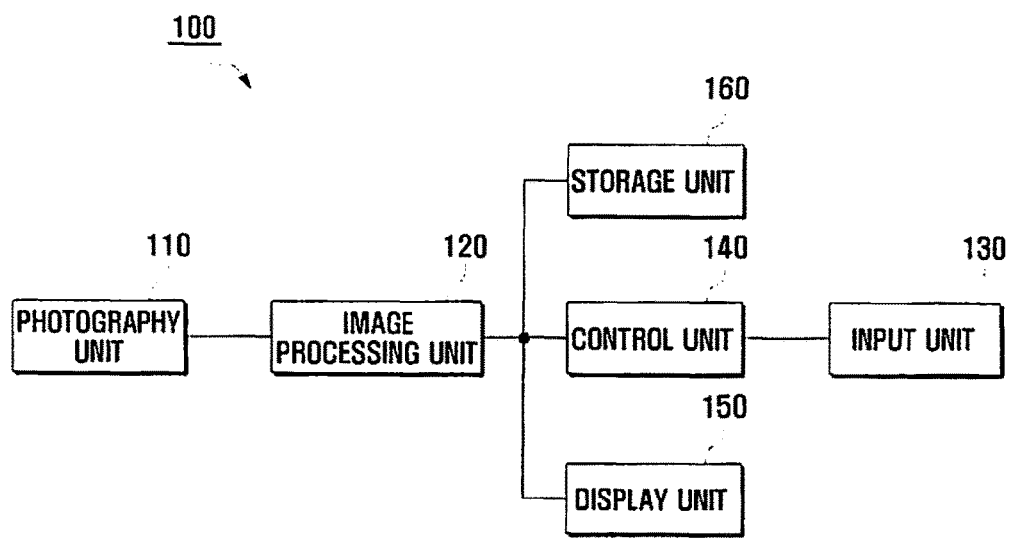
FIG. 1 shows the construction of a portable device according to an embodiment of the present invention.

Advantages and features of the present invention, and ways to achieve them will be apparent from embodiments of the present invention as will be described below together with the accompanying drawings. However, the scope of the present invention is not limited to such embodiments and the present invention may be realized in various forms. The embodiments below are provided to bring the disclosure of the present invention to perfection and assist those skilled in the art to completely understand the present invention. The present invention is defined only by the scope of the appended claims. Also, the same reference numerals are used to designate the same elements throughout the specification.

Referring to FIG. 1, a portable device 100 according to an embodiment of the present invention includes a photography unit 110 for receiving light reflected from an object and converting the light into an electric signal so as to take an image of the object; an image processing unit 120 for processing the electric signal output by the photography unit 110 and outputting image data; an input unit 130 for receiving an input from the user; a control unit 140 for selecting the location of the object from the image data, which is output by the image processing unit 120, based on the input signal from the input unit 130 and moving the focus to the selected location; a display unit 150 for displaying the image data after the focus is moved by the control unit 140; and a storage unit 160 for storing the image data output by the image processing unit 120 under the control of the control unit 140.

The photography unit 110 may include an imaging device or a sensing module, such as a CCD (Charge Coupled Device) or a CMOS (Complementary Metal Oxide Semiconductor), so as to receive light reflected from an object and convert the light into an electric signal.

The image processing unit 120 may include an analog-to-digital converter so as to convert the electric signal, which is output by the photography unit 110, into a digital sequence and output it as image data.

The input unit 130 may include at least one of a keypad and a touch panel. Preferably, a touch panel is used so as to sense the touch of the user's body (e.g. finger), the touch movement while maintaining the touch, and the movement direction.

Figure 2:
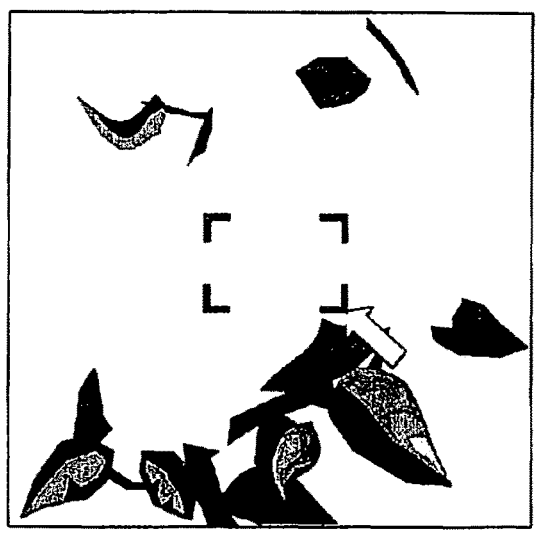
FIG. 2 shows a screen displaying a GUI (Graphic User Interface) for indicating a focus location according to an embodiment of the present invention.

The control unit 140 controls the display unit 150 so as to display the image data. In addition, a GUI (Graphic User Interface) for indicating a focus location (e.g. a cursor, a frame of a predetermined size) may be displayed on the image data as shown in FIG. 2 so that the user can designate the focus location. FIG. 2 shows a screen displaying a GUI for focus location indication according to an embodiment of the present invention.

Figure 3:
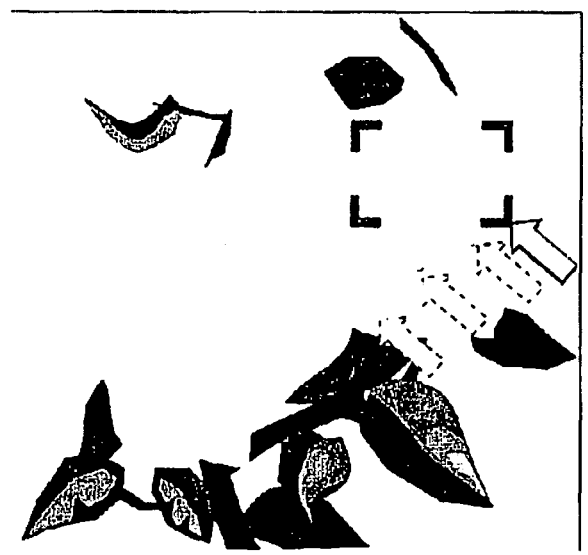
FIG. 3 shows a screen showing the movement of a GUI for indicating a focus location according to an embodiment of the present invention.

Based on the signal input via the input unit 130, the control unit 140 moves the GUI for focus location indication on the image data, which is displayed by the display unit 150, in a corresponding direction as much as a corresponding distance, as shown in FIG. 3, which shows a screen showing the movement of a GUI for focus location indication according to an embodiment of the present invention.

If the input unit 130 is a keypad, for example, the control unit 140 determines how many times or how long a key button (direction key button) is pressed and moves the GUI for focus location indication in the corresponding direction as much as the corresponding pixel interval. If the input unit 130 is a touch pad, the control unit 140 moves the GUI for focus location indication to a pixel location corresponding to the direction and distance of movement sensed by the touch panel.

Upon receiving a signal requesting photography from the input unit 130, the control unit 140 conducts focus processing with regard to the image data input via the image processing unit 120 so that the focus is directed to a region in which the GUI for focus location indication is located, and creates a still or moving image accordingly. The control unit 140 may measure the luminosity of an object in the region, to which the focus location is directed, by using the photography unit 110 and correct the exposure according to the measured luminosity. The focus processing may render the pixel region, which corresponds to the focus location, clearer or render the remaining regions fainter.

The control unit 140 may control the display unit 150 so as to display the created image. Upon receiving a signal requesting storage from the input unit 130, the control unit 140 stores the created image in the storage unit 160.

The control unit 140 can move the focus location of image data (still or moving image) stored in the storage unit 160. Particularly, when a menu (e.g. editing) is selected while the display unit 150 displays image data selected by the user from image data stored in the storage unit 160, the control unit 140 displays a GUI for focus location indication on the displayed image data. Then, the control unit 140 moves the GUI for focus location indication according to a signal from the input unit 130. Upon receiving a signal requesting photography or editing from the input unit 130, the control unit 140 conducts focus processing with regard to the image data so that the focus is directed to a region in which the GUI for focus location indication is located, and newly creates a still or moving image. The previous focus region is subjected to inverse focus processing. For example, the sharpness is lowered to the level of the peripheral region to complete the focus modification. Upon receiving a signal requesting storage via the input unit 130, the control unit 140 stores the newly created image in the storage unit 160.

Figure 4:
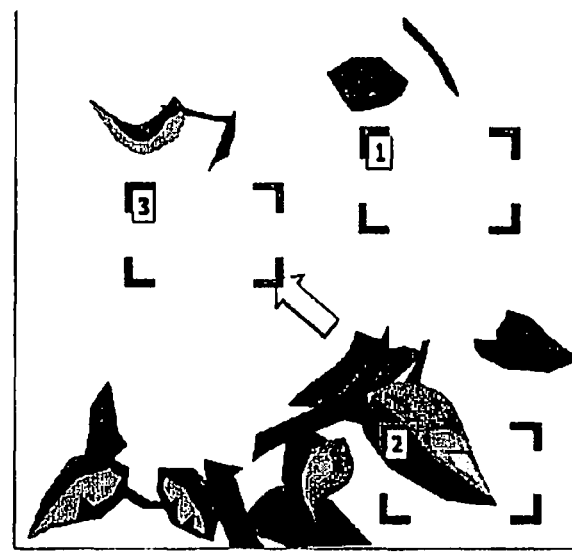
FIG. 4 shows a screen having a number of designated focus locations according to an embodiment of the present invention.

The control unit 140 may conduct focus processing with regard to a number of objects during photography or while image data is edited. Particularly, when a menu for focusing on a number of objects is selected, the control unit 140 displays a GUI for focus location indication on the image data, designates a number of focus locations one after another corresponding respectively to the objects according to signals from the input unit 130, and conducts focus processing with regarding to regions corresponding to the designated focus locations. For example, the control unit 140 controls the display unit 150 so as to display image data output by the image processing unit 120 or image data retrieved from the storage unit 160. Then, the control unit 140 locates a GUI for focus location indication on the displayed image data and moves the GUI according to an input signal so as to designate the first focus location. After designating the first focus location, a GUI for indicating a new focus location is displayed, and the GUI for focus location indication is moved according to an input signal so as to designate the second focus location. In a similar manner, N focus locations are designated as shown in FIG. 4. When a signal requesting photography or editing is input, the control unit 140 conducts focus processing with regard to each designated focus location so as to create a still or moving image, which may be stored in the storage unit 160. FIG. 4 shows a screen having a number of designated focus locations according to an embodiment of the present invention. It can be easily understood by those skilled in the art that, although three focuses are illustrated in the figure, more than three focuses can be designated if necessary.

Even when focus processing is conducted with regard to a number of objects as mentioned above, the control unit 140 can measure the luminosity of objects in respective regions, in which focus locations have been designated, by using the photography unit 110, and correct the exposure of corresponding regions based on the measured luminosity.

The control unit 140 may separately designate a focus location and a photometry location on image data based on signals from the input unit 130. For example, when an image of two persons is to be taken, the control unit 140 focuses on the face region of one of them and measures the luminosity of the face region of the other so as to correct the exposure. In this case, the control unit 140 may control the display unit 150 so as to display not only a focus GUI for indicating the focus location, but also a photometry GUI for indicating the photometry location. Alternatively, a GUI for indicating the photometry location is solely displayed so that, by locating the focus in the default region, the user can designate the photometry location alone by using the input unit 130. In addition, the control unit 140 may receive designation of photometry locations regarding a number of objects from the user, measure the luminosity of the designated regions, and correct the exposure accordingly.

The display unit 150 may include an image buffer for receiving display information regarding respective pixels of the screen from the control unit 140 and displaying a corresponding image on the screen. The display unit 150 may comprise a touch screen or a touch pad, which also acts as the input unit 130, so as to incorporate not only a function for displaying information or data, but also an input function.

The storage unit 160 stores administration data necessary to administrate the portable device 100, and may store image data output by the image processing unit 120 under the control of the control unit 140. In addition, the storage unit 160 may store an image, which has been created by the control unit 140 and which has undergone focus processing, and an image, the exposure of which has been corrected based on photometry, or both of them.

Although not shown in the drawings, the portable device 100 may further include units incorporating additional functions if necessary, such as a transceiver for transmitting/receiving signals to/from an external device or a network, a storage medium insertion unit into which an external storage medium (e.g. memory card) is inserted to store data, a broadcast receiver module for receiving broadcasting signals, an audio signal output device (e.g. speaker), an audio signal input device (e.g. microphone), a connection jack for data exchange with an external digital device, a charging jack, a battery for power supply, a digital sound source playback module (e.g. MP3 module), and a module adapted for electronic commerce or mobile banking. Those skilled in the art can easily understand that, although the variation of portable devices in line with the current trends toward convergence of digital units has been too diversified to be described herein in every detail, the portable device 100 according to the present invention can include an equivalent of any of the above-mentioned units.

Figure 5:
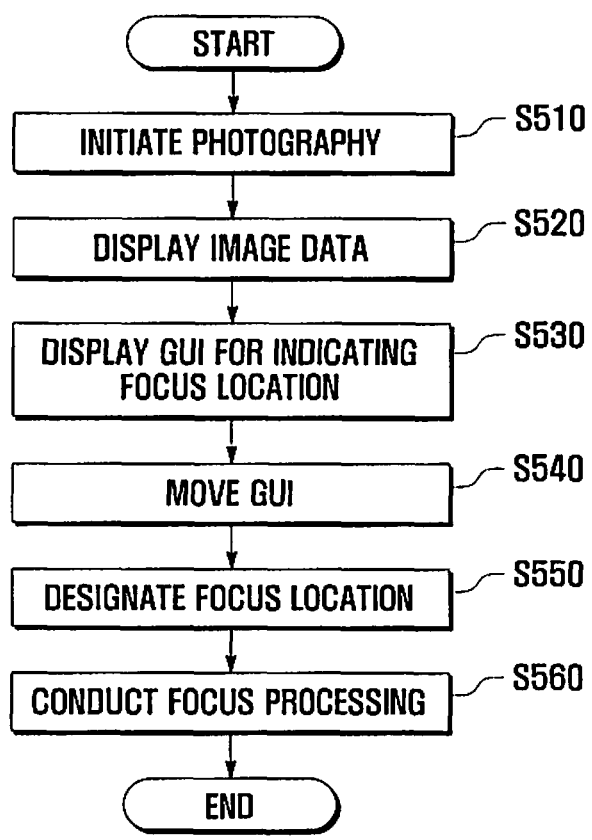
FIGS. 5 to 7 are flowcharts showing methods for taking images with portable terminals according to embodiments of the present invention.
Figure 6:
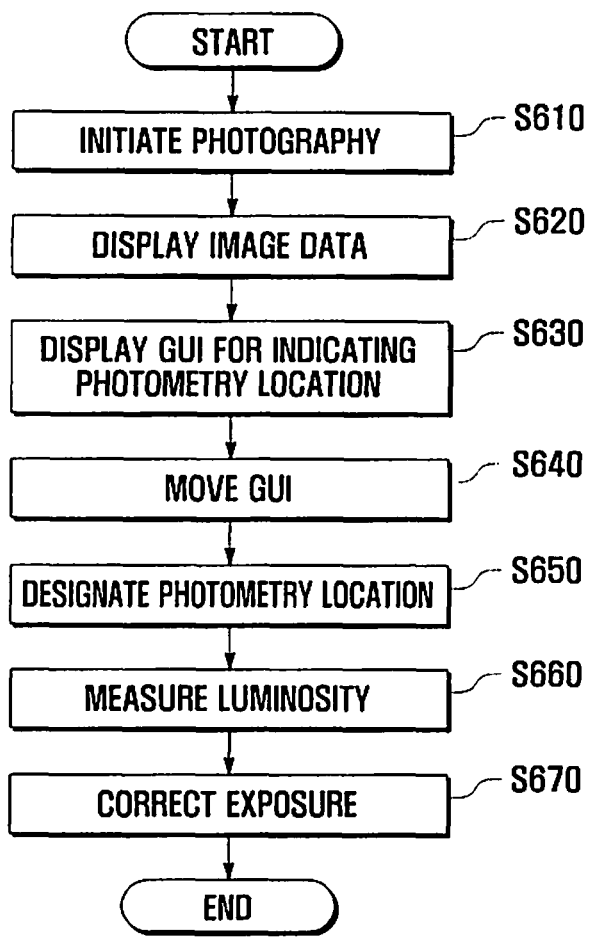
Figure 7:
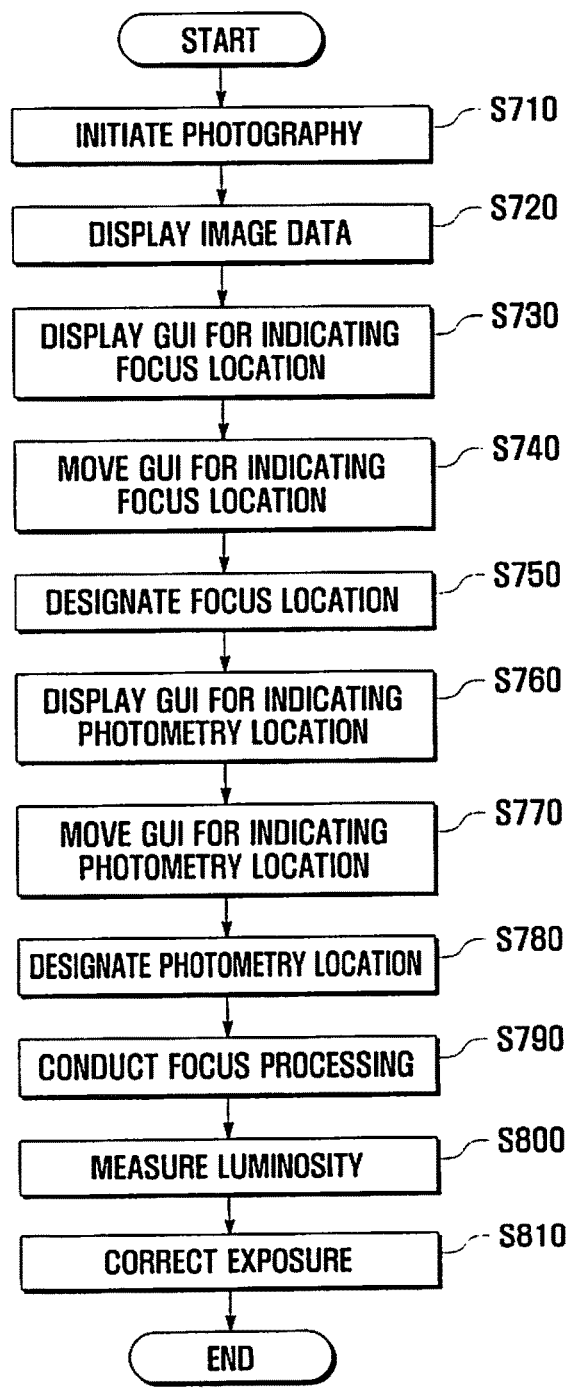

FIGS. 5 to 7 are flowcharts showing methods for taking images with portable terminals according to embodiments of the present invention.

Referring to FIG. 5, a method for taking images with a portable device according to an embodiment of the present invention includes the steps of initiating photography so as to receive an input of an image in step S510; designating at least one focus location in steps S520-S550; and conducting focus processing with regard to at least one region in which the at least one focus location has been designated in step S560.

More particularly, upon receiving a signal requesting photography, the control unit 140 initiates photography and receives an input of an image in step S510. The control unit 140 converts the input image signal into image data and displays it on the screen in step S520. The control unit 140 displays a GUI for indicating a focus location on the displayed image data in step S530). Upon receiving a signal requesting movement of the GUI from the user, the control unit 140 moves the GUI for focus location indication in the corresponding direction as much as the corresponding distance in step S540. Upon receiving a signal requesting designation of the focus location (e.g. "Confirm" or "Complete") from the user, the control unit 140 designates the region, in which the GUI for focus location indication is located, as the focus location in step S550.

Steps S530-S550 may be repeated if necessary. For example, if the user selects a menu for focusing on a number of objects, steps S530-S550 are repeated so that the user can designate a number of focus locations as desired.

After the focus location designation is over, the control unit 140 conducts focus processing with regard to at least one designated focus location region in step S560.

Although not shown in the drawings, the control unit 140 may store images created as a result of the focus processing. In addition, the control unit 140 may measure the luminosity of an object in at least one region, in which the focus location has been designated, of an image created as a result of the focus processing, and corrects (or determines) the exposure of the corresponding region based on the measured luminosity.

Referring to FIG. 6, a method for taking images with a portable device according to an embodiment of the present invention includes the steps of initiating photography so as to receive an input of an image in step S610; designating at least one photometry location in steps S620-S650; measuring the luminosity of an object in at least one region, in which the at least one photometry location has been designated in step S660; and correcting the exposure according to the measured luminosity in step S670.

More particularly, upon receiving a signal requesting photography, the control unit 140 initiates photography and receives an input of an image in step S610. The control unit 140 converts the input image signal into image data and displays it on the screen in step S620. The control unit 140 displays a GUI for indicating a photometry location on the displayed image data in step S630. Upon receiving a signal requesting movement of the GUI from the user, the control unit 140 moves the GUI for photometry location indication in the corresponding direction as much as the corresponding distance in step S640. Upon receiving a signal requesting designation of the photometry location (e.g. "Confirm" or "Complete") from the user, the control unit 140 designates the region, in which the GUI for photometry location indication is located, as the photometry location in step S650.

Steps S630-S650 may be repeated if necessary. For example, if the user selects a menu for photometry of a number of objects, steps S630-S650 are repeated so that the user can designate a number of photometry locations as desired.

After the photometry location designation is over, the control unit 140 measures the luminosity of an object in at least one designated photometry location region in step S660. The control unit 140 corrects the exposure according to the measured luminosity in step S670.

Although not shown in the drawings, the control unit 140 may store images created as a result of the exposure correction. In addition, the control unit 140 may conduct focus processing with regard to at least one region, in which the photometry location has been designated, of an image created as a result of the exposure correction.

Referring to FIG. 7, a method for taking images with a portable device according to an embodiment of the present invention includes the steps of initiating photography so as to receive an input of an image; designating at least one focus location and at least one photometry location; conducting focus processing with regard to at least one focus region, in which the at least one focus location has been designated; and measuring the luminosity of an object in at least one photometry region, in which the at least one photometry location has been designated so as to correct the exposure.

More particularly, upon receiving a signal requesting photography, the control unit 140 initiates photography and receives an input of an image in step S710. The control unit 140 converts the input image signal into image data and displays it on the screen in step S720. The control unit 140 displays a focus GUI for indicating a focus location on the displayed image data in step S730. Upon receiving a signal requesting movement of the focus GUI from the user, the control unit 140 moves the focus GUI in the corresponding direction as much as the corresponding distance in step S740. Upon receiving a signal requesting designation of the focus location from the user, the control unit 140 designates the region, in which the GUI for focus location indication is located, as the focus location in step S750. As mentioned above, steps S730-S750 may be repeated if necessary.

After the focus location designation is over, the control unit 140 displays a photometry GUI for indicating a photometry location on the displayed image data in step S760. Upon receiving a signal requesting movement of the photometry GUI from the user, the control unit 140 moves the photometry GUI in the corresponding direction as much as the corresponding distance in step S770. Upon receiving a signal requesting designation of the photometry location from the user, the control unit 140 designates the region, in which the photometry GUI is located, as the focus location in step S780. As mentioned above, steps S760-S780 may be repeated if necessary.

After designation of focus and photometry locations is over, the control unit 140 conducts focus processing with regard to at least one designated focus location region in step S790.

The control unit 140 measures the luminosity of an object in at least one designated photometry location region in step S800. The control unit 140 corrects the exposure according to the measured luminosity in step S810.

As mentioned above, the inventive portable device and method for taking images with the same provide a GUI indicating a focus location and a photometry location on the screen so that the user can move the GUI by using a keypad or a touch panel. This is advantageous in that the user can designate the focus or photometry location at a desired object or location during photography. Therefore, the present invention ensures a higher level of photography and, in particular, satisfies high-end users to a larger extent.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electronic device comprising:
   an imaging device configured to convert light into image data;
   an image processing unit electrically coupled with the imaging device and configured to process the image data received from the imaging device;
   a controller electrically coupled with the image processing unit, a display, and a touch panel,
   wherein the controller is configured:
   to control the display to display an image, a first graphical user interface (GUI) at or near a face region on the image, and a second GUI at a first location on the image in response to a first touch being sensed by the touch panel at or near the first location;
   to adjust the image for focusing the image at the first location in response to the first touch;
   to control the display to display the second GUI at a second location on the image when a second touch is sensed by the touch panel at or near the second location;
   to release a focus at the first location when the second touch is sensed; and
   to adjust the image for focusing the image at the second location in response to the second touch.

2. The electronic device of claim 1, wherein the controller is further
   configured to detect at least one face region if the first image includes at least one face.

3. The electronic device of claim 1, wherein the controller is further
   configured to:
   control the display to display the image while the imaging device has a first exposure based on the image data processed by the image processing unit;
   measure luminosity based on the face region on the image; and
   control the display to display the image while the imaging device has a second exposure based on the measured luminosity on the face region.

4. The electronic device of claim 1, wherein the controller is further
   configured to:
   adjust the image to be focused at the second location in response to the second touch;
   measure luminosity based on the second location; and
   control the display to display the image while the imaging device has a third exposure based on the measured luminosity on the second location.

5. The electronic device of claim 1, wherein the controller is further
   configured to:
   measure luminosity based on the first location; and
   control the display to display the image while the imaging device has a fourth exposure based on the measured luminosity on the first location.

6. The electronic device of claim 1, wherein the controller is further
   configured to:
   store the image to a memory associated with the electronic device;
   control the display to display the stored image; and
   change a luminosity of the stored image in response to a user input on the touch panel.

7. The electronic device of claim 1, wherein the controller is further
   configured to control the imaging device to have a first exposure, a second exposure, a third exposure and a fourth exposure, which are different from each other.

8. The electronic device of claim 1, wherein the controller is further
   configured to display the second GUI when one of the first and second touch are sensed on the touch panel regardless of a detection of the face region.

* * * * *